Figure 1:
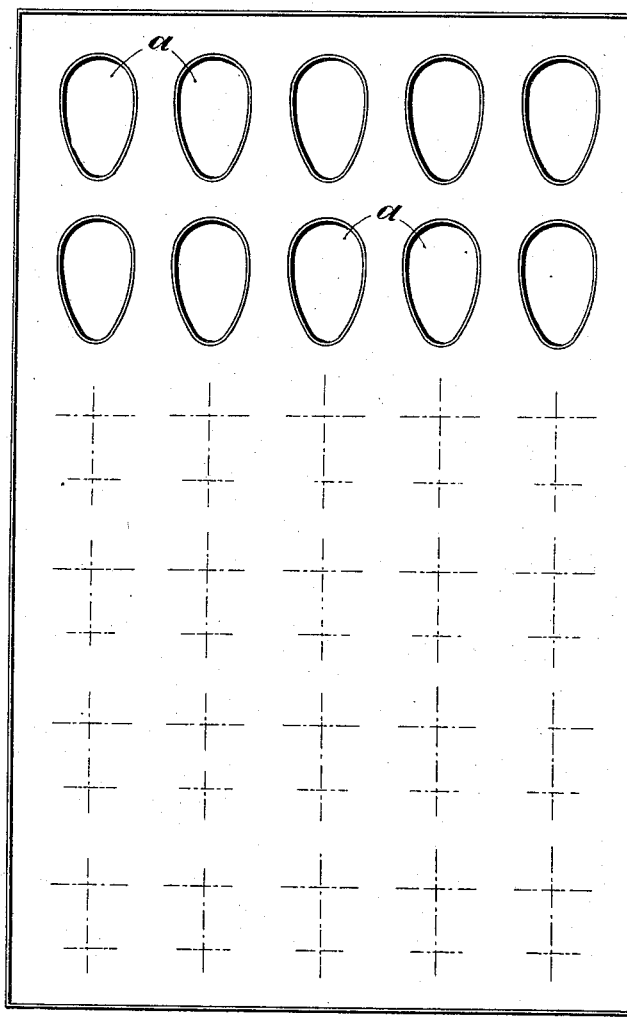

E. HÜTHER.
METHOD FOR MAKING HOLLOW SWEETMEATS AND THE LIKE.
APPLICATION FILED MAR. 10, 1916.

1,201,825.

Patented Oct. 17, 1916.
2 SHEETS—SHEET 1.

INVENTOR
Ernst Hüther
BY
ATTORNEYS

E. HÜTHER.
METHOD FOR MAKING HOLLOW SWEETMEATS AND THE LIKE.
APPLICATION FILED MAR. 10, 1916.

1,201,825.

Patented Oct. 17, 1916.
2 SHEETS—SHEET 2.

INVENTOR
Ernst Hüther
BY
ATTORNEYS

UNITED STATES PATENT OFFICE.

ERNST HÜTHER, OF SAALFELD-ON-THE-SAALE, GERMANY.

METHOD FOR MAKING HOLLOW SWEETMEATS AND THE LIKE.

1,201,825.   Specification of Letters Patent.   Patented Oct. 17, 1916.

Application filed March 10, 1916. Serial No. 83,307.

*To all whom it may concern:*

Be it known that I, ERNST HÜTHER, a subject of the King of Prussia, residing at Saalfeld-on-the-Saale, in the Duchy of Saxe-Meiningen and German Empire, have invented a new and useful Improved Method for Making Hollow Sweetmeats and the like, of which the following is a specification.

My present invention relates to an improvement of the known method for making sweetmeat, in which the hollow body of the sweetmeat is closed by pressing a covering layer on the edge of said body while it is still in the mold.

According to the invention the covering substance is applied to a supporting sheet—for example of paper—which is larger than the mold used. The sheet with the covering substance applied thereto is then pressed on the mold, in an inverted position, so that the comparatively sharp edge of said mold stamps out a cover, which is depressed more or less into the mold, the desired connection of said cover with the hollow body being thus effected in such a perfect manner that both parts become quite integral.

Compared with existing methods this method offers a better guaranty that hollow sweetmeat having a liquid filling, or a part filling, or quite without any filling, will be more perfectly closed.

My new method of making sweetmeat is described below with reference to the drawing which shows apparatus suitable for the purpose.

Figure 2:
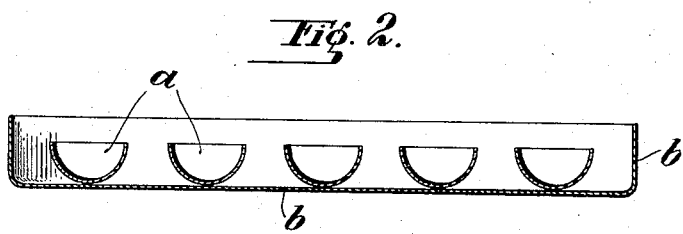
Figure 3:
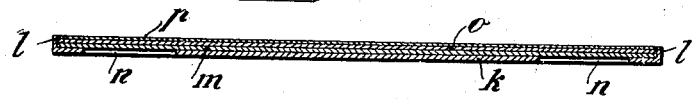
Figure 4:
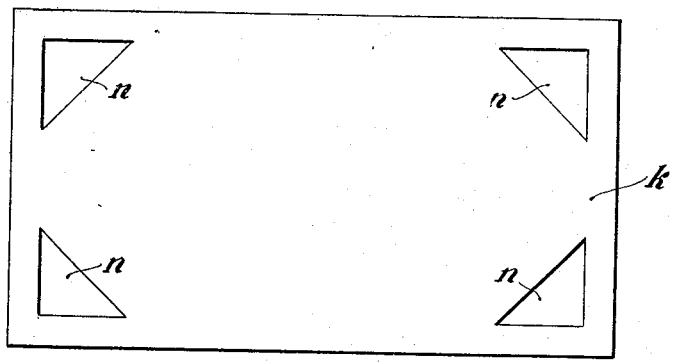
Figure 6:
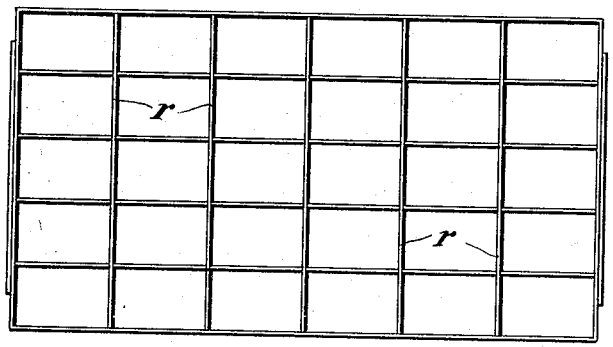
Figure 7:
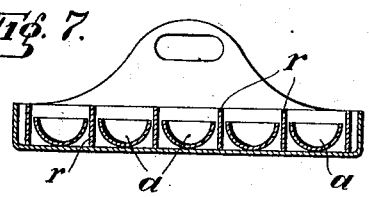
Figure 8:
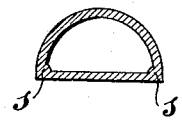
Figure 5:
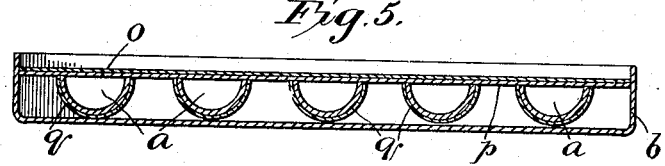
Figure 5:

Figure 1 shows by way of example a plan view of a mold which can be used in carrying out my invention. Fig. 2 is a cross section of said mold. Fig. 3 is a longitudinal section through a device designed to facilitate the application of the covering substance to the supporting sheet. Fig. 4 shows a bottom view of said device. Fig. 5 is a section through the mold to which the covering layer has been applied. Fig. 6 is a plan view of a device for breaking off the superfluous covering substance from the closed sweetmeat. Fig. 7 represents the position taken by the device shown in Fig. 6 when it has been applied to a series of molds. Fig. 8 shows a section through one of the sweetmeats when ready.

The molds shown in Figs. 1 and 2 consist of cups $a$ which are fastened to the tray $b$ by soldering, or in any other suitable manner. The inside of these cups $a$ is provided with a lining of chocolate or other substance, which is done by means of a lining bag, brush, filling machine, squirt, or other apparatus now commonly used for the purpose. As soon as the lining of the cups is finished the filling of cognac, wine, cream or other material is introduced into the lined cups, which can be done, for example, by a portable or fixed casting device of the kind now in use in the art. The molds thus lined and filled are then closed by a covering layer of chocolate or other suitable material. For this purpose a sheet of paper is provided with a layer of the material used by suitable means, for example, by a brush, and then the sheet supporting the material is inverted and placed on the cups $a$.

The device shown in Figs. 3 and 4 for facilitating the application of the covering substance to the sheet of paper or the like consists of a tray $k$ having an upwardly projecting edge $l$, in which fits the metal plate $m$. The tray $k$ has several openings $n$ to enable the plate $m$ to be more easily raised. On the plate $m$ is placed the sheet $o$ of paper or the like, and on this sheet the chocolate material is applied, the edge $l$ serving as a wiper for the brush used. Of course the plate $m$ is not absolutely necessary, and the sheet of paper, or the like, may be placed immediately on the tray without any intervening layer. The sheet $o$ carrying the layer of chocolate or the like is then placed on the molds $a$ with the chocolate layer downward (Fig. 5). On the molds thus covered a plate of metal or other suitable material is pressed, so that the edge $q$ of the molds $a$ is caused to enter more or less into the chocolate layer $o$ and thus to cut out covers which exactly fit the bodies in the molds. These covers being simultaneously pressed somewhat into the molds $a$ perfect union of their edges with the edges of the bodies in said molds is effected. After removing the press plate and allowing the molds to cool in the usual manner, the sheet $o$ of paper or the like is drawn off, and the hardened chocolate still remaining between the cups $a$ is broken off from the covers united with the bodies in the molds by placing the frame $r$ (Fig. 6) over the cups and lowering it into the position shown in Fig. 7.

By my invention it is rendered possible to make sweetmeats without using a sugar solution or any addition of sugar and without any danger of the liquid contents running out, a quite essential saving of wages being effected at the same time. As will be evident from Fig. 8, which shows a section through a chocolate sweetmeat produced according to the invention the lower edge *s* of the outer wall of the hollow body is even somewhat thickened and is thus rendered stronger at a point where such hollow sweetmeats produced according to other methods are usually very weak.

What I claim and desire to secure by Letters Patent of the United States is:—

1. The described method for making hollow sweetmeats, which consists in lining a sharp edged mold with the substance designed to form the outer wall of the sweetmeat, filling the hollow open body thus made, applying the material for the cover to a flexible sheet which is larger than said mold, and pressing said sheet with the freshly applied material downward on the edge of said mold, whereby the material on the sheet will be cut and forced into the mold to unite with the lining substance thereof.

2. The described method for making hollow sweetmeats, which consists in lining a sharp edged mold with the substance designed to form the outer wall of the sweetmeat, filling the hollow open body thus made, applying the material for the cover to a flexible sheet larger than said mold, pressing said sheet with the freshly applied material downward on the edge of said mold to cut the material and force it into the mold so that it will unite with the lining substance thereof, allowing the applied material to cool and harden, drawing off the sheet from said applied material and breaking off the hardened covering material outside of the mold, substantially as, and for the purpose, set forth.

3. In a method for making hollow sweetmeats the steps which consist in covering sharp edged molds with a flexible sheet supporting a layer of sweetmeat substance with said substance directed downward, pressing said sheet on said molds, whereby to cut the substance and force it into the mold, drawing off said sheet when said substance has hardened, and breaking off the hardened substance between said molds, substantially as, and for the purpose, set forth.

In testimony whereof I have signed my name to this specification in the presence of two subscribing witnesses.

ERNST HÜTHER.

Witnesses:
 HENRY HASPER,
 SAMUEL GEORGE FINFF.

Copies of this patent may be obtained for five cents each, by addressing the "Commissioner of Patents, Washington, D. C."